United States Patent [19]

Fougner

[11] 3,939,247

[45] Feb. 17, 1976

[54] PRODUCTION OF ALUMINUM TRICHLORIDE AND MAGNESIUM OXIDE

[76] Inventor: Sven Fougner, 110 10th St., Garden City, N.Y. 11530

[22] Filed: Aug. 27, 1973

[21] Appl. No.: 391,747

[52] U.S. Cl. ................ 423/135; 423/155; 423/495; 423/636; 208/297
[51] Int. Cl.² ..... C01F 7/60; C01F 7/56; C01F 5/02
[58] Field of Search ............ 423/495, 135, 155, 636

[56] References Cited
UNITED STATES PATENTS

| | | | |
|---|---|---|---|
| 1,682,743 | 9/1928 | Egloff ............................ | 423/135 X |
| 3,222,127 | 12/1965 | Wilson ................................ | 423/495 |

OTHER PUBLICATIONS
California Mining Journal, p. 10, Feb. 1942.

*Primary Examiner*—Edward Stern
*Attorney, Agent, or Firm*—Cooper, Dunham, Clark, Griffin & Moran

[57] ABSTRACT

Alumina is reacted with magnesium chloride in accordance with the chemical reaction $$Al_2O_3 + 3MgCl_2 \rightarrow 3MgO + 2AlCl_3$$

in the presence of a mixed mass of inert solid contact material, such as a fluidized mass of magnesium oxide particles. The aluminum trichloride is recovered and is advantageously employed in the treatment of hydrocarbonaceous material, such as retorted shale oil, to improve the physical and/or chemical properties thereof. The substantially carbon and/or hydrocarbon free retorted aluminiferous oil shale is useful as the source of the alumina in the above chemical reaction.

14 Claims, 2 Drawing Figures

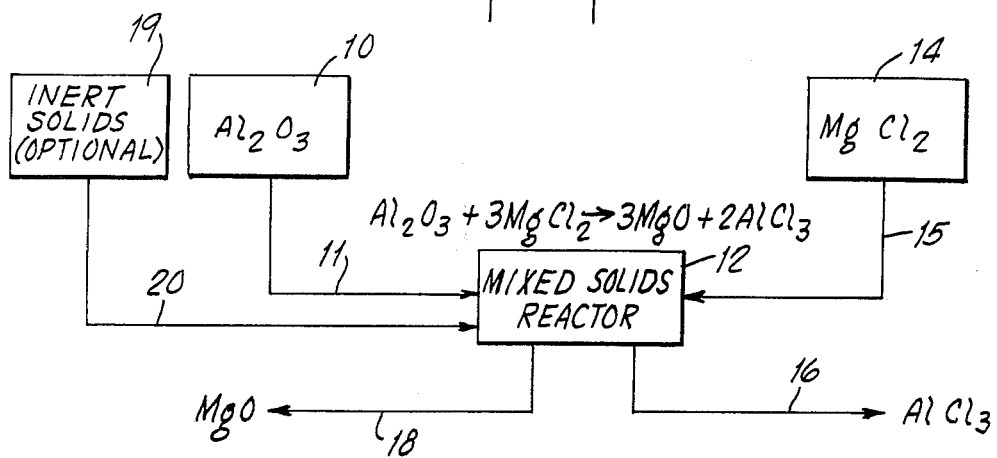
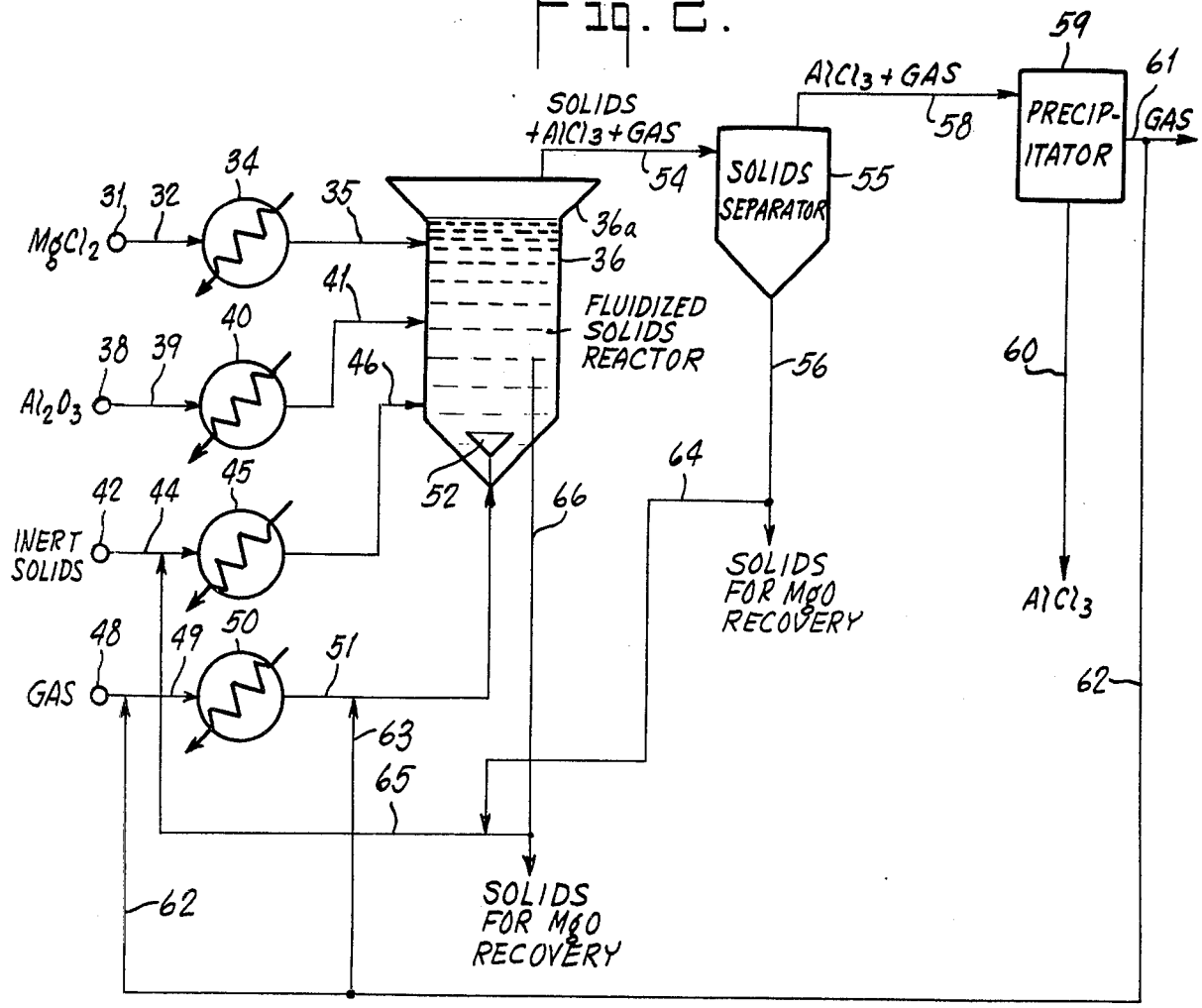

PRODUCTION OF ALUMINUM TRICHLORIDE AND MAGNESIUM OXIDE

This invention relates to the production of aluminum trichloride. In one special embodiment this invention is related to the production of aluminum trichloride and magnesium oxide by reacting alumina or an alumina-containing material with anhydrous magnesium chloride with the resulting production of aluminum trichloride and magnesium oxide. In another special embodiment of the practices of this invention retorted alumina-containing oil shale substantially free of carbonaceous or hydrocarbonaceous material is reacted with magnesium chloride to produce magnesium oxide and aluminum trichloride and the resulting produced aluminum trichloride advantageously employed to treat the shale oil recovered from the retorted oil shale so as to improve the physical and/or chemical properties thereof.

Aluminum trichloride is a useful commercial chemical and has been suggested as a suitable source for the production of elemental aluminum, see U.S. Pat. Nos. 3,464,900 and 3,508,908. Other uses of aluminum trichloride are known, such as in the processing of petroleum fractions, see U.S. Pat. Nos. 1,682,743 and 2,797,981.

Magnesium oxide is also a useful compound and many uses for magnesium oxide are known, such as in the manufacture of refractory materials and as a neutralizing agent for acids, see also U.S. Pat. No. 3,447,901 for a process for the manufacture of magnesium oxide.

It is also known to produce aluminum trichloride, see particularly U.S. Pat. Nos. 1,506,104, 1,507,709, 1,528,038, 1,649,383 and 1,764,502.

The disclosures of each of the above-identified patents are herein incorporated and made part of this disclosure.

It is an object of this invention to provide a process for the manufacture of aluminum trichloride and magnesium oxide.

It is another object of this invention to provide an improved process for the manufacture of aluminum trichloride from alumina or alumina-containing or aluminiferous materials by reaction with molten magnesium chloride.

It is another object of this invention to provide a process for the manufacture of aluminum trichloride from alumina-containing retorted oil shale wherein the resulting produced aluminum trichloride is employed to treat the retorted shale oil to improve the physical and/or chemical properties thereof.

In at least one embodiment of the practices of this invention at least one of the foregoing objects will be achieved. How these and other objects of this invention are achieved will become apparent in the light of the accompanying disclosure and drawings wherein:

FIG. 1 schematically illustrates the practices of this invention involving the reaction of alumina with magnesium chloride within a reactor to produce magnesium oxide and aluminum trichloride; and wherein FIG. 2 schematically illustrates another embodiment of the practices of this invention wherein magnesium chloride, alumina-containing material and inert solids are con ined to form a fluidized solids reaction admixture with the resultant production and recovery of aluminum trichloride and magnesium oxide.

In accordance with this invention magnesium chloride is reacted with alumina or alumina-containing or aluminiferous material in accordance with the chemical equation, $$Al_2O_3 + 3MgCl_2 \rightarrow 3MgO + 2AlCl_3$$

to produce aluminum trichloride and magnesium oxide. The reaction between the magnesium chloride and the alumina or alumina-containing or aluminiferous material is carried out in a mixed solids reactor wherein solid particle-form alumina or alumina-containing or aluminiferous material is mixed or stirred or continuously moved as it is brought into contact and/or maintained in contact with anhydrous magnesium chloride. Advantageously, there may also be present in the mixed solids reactor substantially inert solid particulate material together with the magnesium chloride and the alumina or alumina-containing or aluminiferous material. Also, an inert gas is advantageously moved through the mixed solids reactor during the reaction between the magnesium chloride and the alumina or the alumina-containing or aluminiferous material so as to sweep and remove the resulting produced gaseous aluminum trichloride from the reactor.

In one special embodiment of the practices of this invention the inert solid particulate material added to or present in the mixed solids reactor is magnesium oxide. In one practice of this special embodiment of the invention substantially pure alumina would be reacted with anhydrous magnesium chloride, preferably added to the reactor in molten form, in the presence of added particulate magnesium oxide to produce aluminum trichloride and magnesium oxide. Further, in this special embodiment of the practices of this invention the two reactants magnesium chloride and alumina would react to yield two reaction products, aluminum trichloride and magnesium oxide, which would be readily separable in substantially pure form.

Referring now to FIG. 1 of the drawings, there is illustrated therein one practice of this invention wherein alumina or alumina-containing or aluminiferous material is reacted with magnesium chloride in accordance with the indicated chemical equation:

$$Al_2O_3 + 3MgCl_2 \rightarrow 3MgO + 2AlCl_3$$

As indicated in the above equation there are produced as the reaction products aluminum trichloride and magnesium oxide. In the practice of this embodiment of the invention there may be optionally added or present in the solids reactor inert solids, preferably of a particle size e.g. larger, in the form of granules, pellets, balls, etc., such that the inert solids can be readily separated from the resulting produced solid magnesium oxide.

More specifically, in the practice of the invention illustrated in FIG. 1, alumina, such as freshly prepared alumina, especially the less crystalline, freshly prepared aluminas and those aluminas which have not been subjected to high calcining temperatures, e.g., eta-alumina and gamma-alumina, and which are more reactive, is supplied from a suitable source 10 via line 11 to mixed solids reactor 12. There is also introduced into reactor 12 anhydrous magnesium chloride from a suitable source 14 via line 15. Desirably, the magnesium chloride supplied to reactor 12 is anhydrous molten magnesium chloride.

Upon contact of the magnesium chloride with the alumina within reactor 12 and at a suitable elevated reaction temperature, preferably a temperature above the melting point of magnesium chloride, about 714°C., reaction between the magnesium chloride and alumina takes place with the resulting production of gaseous aluminum trichloride and solid magnesium oxide. The resulting produced gaseous aluminum trichloride is removed from reactor 12 via line 16 for recovery. Removal of the aluminum trichloride from reactor 12 is facilitated by flowing an inert gas, by means not shown, such as nitrogen, through reactor 12 to sweep the gaseous aluminum trichloride therefrom as it is produced. Further, this sweep gas might also be usefully employed to sweep any finely divided magnesium oxide produced in the reaction, which magnesium oxide can be readily separated from the gaseous aluminum trichloride by a suitable gas-solids separator, such as a filter or cyclone separator. As indicated, the produced magnesium oxide may be separately removed from reactor 12 via line 18 for recovery.

Optionally, in the practice of the embodiment of the invention illustrated in FIG. 1 inert particulate solid material may be supplied from a suitable source 19 via line 20 to reactor 12. Desirably, the inert solids supplied via line 20 to reactor 12 are of a particle size such that these inert solids can be readily separated from the resulting produced magnesium oxide. In accordance with a special embodiment the inert solids supplied to reactor 12 comprise magnesium oxide, such as magnesium oxide pellets or spheres. In this special embodiment of the practices of the invention there would be no concern with respect to effecting the separation of the added inert solids from the resulting produced magnesium oxide.

The reaction involving alumina and magnesium chloride for the production of aluminum trichloride and magnesium oxide is an endothermic reaction. Accordingly, the required endothermic heat of reaction must be supplied to the reaction admixture within reactor 12 by suitable means. It is desirable to carry out the reaction within reactor 12 at an elevated temperature, such as a temperature above the melting point of magnesium chloride, so as to carry out the reaction at a fast rate and thereby increase the throughput or productivity of reactor 12. A suitable temperature at which to carry out the reaction within reactor 12 would be in the range from about 750°C. up to about 2000°C. which is approximately the softening point of the system comprising magnesium oxide and alumina. Satisfactory results are usually obtained by carrying out the reaction at a temperature in the range 750°–1500°C., preferably at a temperature in the range 800°–1000°C.

As indicated hereinabove, the reaction between alumina and magnesium chloride is endothermic, requiring about 45,000 BTU per pound mol of reacted magnesium chloride at the reaction temperatures in accordance with the preferred practices of this invention. The required endothermic heat of reaction may be supplied by heating the reactor from an external or internal source, such as by means of electrical resistance heaters or by directly heating the outside of the reactor or providing means within the reactor for effecting indirect heat exchange between the reactor contents and a heating fluid. Also, if desired, the required endothermic heat of reaction may be supplied by one or more of the reactants supplied to the reactor. For example, assuming reactor 12 and the reaction therein is maintained at a temperature of 800°C., the magnesium chloride and/or the alumina supplied thereto would be heated to a temperature, i.e., substantially above 800°C., such as a temperature at least about 100 degrees Centigrade higher, e.g., to a temperature about 1000°C., to supply the required heat of reaction. Alternatively or supplemental thereto, any inert sweep gas introduced to reactor 12 to sweep the aluminum trichloride therefrom could also be heated to a temperature substantially above the reaction temperature maintained within reactor 12. Also, supplemental or alternatively, a mass of inert solids, such as refractory pebbles, e.g. zirconia pebbles or magnesium oxide pebbles, heated to a temperature above the reaction temperature employed within reactor 12 could be supplied to reactor 12 to provide the required endothermic heat of reaction. Combinations of any of the techniques mentioned for supplying the required heat of reaction could be employed. If desired, one or more of the reactants could be supplied to reactor 12 even at a temperature substantially below the reaction temperature maintained within reactor 12, in which instance reliance would be had to one or more of the aforementioned techniques for heating the reactants within the reactor to the desired reaction temperature.

Reactor 12 wherein alumina and magnesium chloride are reacted in accordance with this invention may take any suitable form. A particularly preferred form or embodiment of reactor 12 would be a fluidized solids reactor. This special advantageous embodiment in the practice of this invention is more fully illustrated in accompanying FIG. 2 and will be described in greater detail hereinbelow.

In accordance with one embodiment reactor 12 could comprise a rotary kiln wherein magnesium chloride and alumina are supplied at one end and the resulting reaction products magnesium oxide and aluminum trichloride recovered at the other end. In this embodiment the rotary kiln could be heated either internally by electrical resistance heaters or by other suitable heaters, such as by indirect heat exchangers for heating the kiln contents or could be externally fired. The required endothermic heat of reaction, in whole or in part, could also be supplied by sweeping the kiln with a hot inert gas. The hot inert gas introduced into the rotary kiln to supply the required heat of reaction could move either concurrently or countercurrently with respect to the movement of the alumina and magnesium chloride introduced into the kiln. Further, as indicated hereinabove, the required heat of reaction could be supplied by introducing into the kiln together with the alumina and magnesium chloride a mass of hot inert solid materials, such as refractory zirconia or magnesium oxide pebbles and the like.

In another embodiment reactor 12 could comprise a furnace which could be externally or internally heated and wherein the reactants alumina and magnesium chloride could be mechanically stirred or mixed or rabbled, such as in a metallurgical furnace, while at the same time continuously drawing off the resulting produced solids MgO and the resulting produced gaseous aluminum trichloride.

Further, reactor 12 could comprise a tower provided with baffles to effect interrupted downward movement of the solids introduced into the top thereof. In this embodiment hot inert solid materials, such as refractory pebbles, e.g., MgO pellets, together with alumina and magnesium chloride would be introduced into the top of the tower and the resulting reaction admixture would descend or cascade downwardly within the tower. Desirably, in this embodiment a sweep gas would be introduced into the bottom of the tower to sweep the resulting produced aluminum trichloride which could be conveniently removed and recovered from near the top of the tower.

Many other embodiments of a reactor suitable for carrying out the reaction illustrated in FIG. 1 would be useful. The essential requirement of reactor 12 is to provide means for effecting contact between the particulate alumina-containing or alumiferous material introduced thereinto and the magnesium chloride which is also introduced into the reactor and for permitting the withdrawal of the resulting produced gaseous aluminum trichloride as it is produced within the reactor.

The magnesium chloride employed to carry out the reaction is desirably supplied to the reactor in molten anhydrous form. Commercially available magnesium chloride, essentially anhydrous magnesium chloride, is obtained by the dehydration of magnesium chloride-containing tailings or bitterns resulting from salt or potash operation or from the solar evaporation of brines. Crude anhydrous magnesium chloride from such operations usually contain, after a preliminary drying step, approximately 80–90% by weight magnesium chloride, the remainder comprising small amounts of other chlorides and substantially equal amounts of magnesium oxide and water, the water being present partly as water of crystallization and partly in combined form as magnesium hydroxychloride. When this material is heated to an elevated temperature above the melting point of magnesium chloride, i.e., about 714°C., such as up to about 950°–1000°C., there is produced an essentially anhydrous magnesium chloride having a water content of less than about 1%. The magnesium hydroxychloride largely decomposes to form magnesium oxide and hydrogen chloride. The hydrogen chloride readily separates from the molten magnesium chloride leaving behind a melt of magnesium chloride containing a small, minor amount, approximately about 10%, more or less, by weight magnesium oxide suspended therein. The presence of the substantially inert high melting point magnesium oxide in such magnesium chloride supplied as a reactant in the practice of this invention is not detrimental and in some embodiments of the practice of this invention might be considered advantageous.

Further, in the reaction carried out within reactor 12 it is preferred that the proportions or amounts of the reactants, magnesium chloride and alumina, be added in stoichiometric amounts since there is little or no advantage in adding an excess of one or more of the reactants to force the chemical reaction in the direction to produce magnesium oxide and aluminum trichloride since the reaction is readily promoted to go in the direction for the production of aluminum trichloride by the removal of the resulting produced gaseous aluminum trichloride. The removal of the gaseous aluminum trichloride as it is being produced during the reaction is easily accomplished by venting the reactor to permit the gaseous aluminum trichloride to enter a suitable container or receiver for precipitation of the aluminum trichloride.

As has been indicated hereinabove any suitable source of alumina might be usefully employed in the practice of tihs invention. Freshly precipitated and prepared alumina, such as might be prepared by the Bayer process wherein alumina trihydrate is precipitated from a solution of sodium aluminate and which could then be dehydrated to produce alumina is an especially useful source of alumina because of its purity. Dehydrated naturally occurring clays, including bauxite and other high alumina content clays, are also useful as sources of alumina for carrying out the reaction in accordance with this invention.

Another useful source of alumina would be those alumina-containing shales or clays derived from retorted oil shale, such as the dawsonite rich $NaAlCO_3.(OH)_2$, alumina-containing oil shale of the Piceance Basin in Colorado and other areas. In the retorting of alumina-containing oil shales the shale oil or kerogen is readily distilled or removed from the oil shale by heating at moderately elevated temperatures, usually in the range not greater than about 900°–1000°F. Such retorted alumina-containing oil shales, now substantially carbon-free or free of hydrocarbonaceous materials, provide a reactive alumina source for reaction with magnesium chloride in accordance with the practice of this invention. Additionally, the shale oil recovered from the retorting operation could be usefully treated, such as in the vapor or liquid form with the aluminum trichloride in gaseous or other form, e.g. an aluminum trichloride hydrocarbon complex, for improving the physical and/or chemical properties of the shale oil. Such treating operations could conveniently be carried out in gaseous form at elevated temperatures in the range 300°–800°C., more or less.

In the practices of the various embodiments of this invention it has been described that a sweep gas might be employed for a number of reasons, such as to supply at least in part the required endothermic heat of reaction and, especially desirably, to remove the resulting produced gaseous aluminum trichloride from the reactor. Any inert sweep gas may be employed in the practice of this invention. Gaseous nitrogen is especially useful. However, any oxygen-free or water-free inert sweep gas is useful. Suitable inert gases, in addition to nitrogen, would include helium and any of the other so-called noble gases, such as argon, as well as other effectively non-reactive gases.

Reference is now made to FIG. 2 of the drawings which illustrate a presently preferred embodiment of the practice of the invention wherein the reaction between alumina and magnesium chloride is carried out in a fluidized solids reactor. As illustrated in FIG. 2, magnesium chloride from a suitable source 31 is passed via line 32 through heater 34 to melt the magnesium chloride and the resulting molten magnesium chloride introduced via line 35 to reactor 36. Particulate solid alumina, such as alumina having a particle size in the range 150–1400 microns, e.g., average particle size about 500 microns, is supplied from a suitable source 38 via line 39 to heater 40 and the resulting heated alumina supplied via line 41 to reactor 36. Also, particulate inert solids, such as magnesium oxide, having a particle size substantially the same as the alumina, are supplied from a suitable source 42 via line 44 through heater 45 and line 46 into reactor 36. An inert gas, such as nitrogen, is supplied from a suitable source 48 via line 49 through heater 50 and line 51 to distributor 52 provided within reactor 36. The temperatures of the magnesium chloride, alumina, inert solids and gas introduced into reactor 36 are adjusted so as to maintain the temperature within reactor 36 in the range 800°–1500°C. The reactants, the inert solids and the gas are introduced into reactor 36 to provide therein a fluidized solids reaction admixture wherein the gas introduced into reactor 36 via line 51 and distributor 52 turbulently moves and circulates the solids therein as a fluidized mass of solids in the manner of a vigorously boiling liquid.

There issues via line 54 from the upper end of the enlarged portion 36a of reactor 36 a gaseous effluent comprising the fluidizing gas, gaseous aluminum trichloride, and finely divided solids which are entrained in the gaseous effluent issuing via line 54. For the most part, the finely divided solids comprise magnesium oxide. The solids-gas stream is introduced via line 54 into solids separator or cyclone separator 55 wherein the solids are separated and removed via line 56 for recovery of magnesium oxide as product. The substantially solids-free gaseous effluent from separator 55 comprising substantially only gaseous aluminum trichloride and the fluidizing gas is moved from separator 55 via line 58 to precipitator 59. Precipitator 59 may be a cooled, scraped precipitator wherein the aluminum trichloride containing gas is cooled to solidify or precipitate out the aluminum trichloride which is recovered via line 60. The resulting solids-free, substantially aluminum trichloride-free gas is recovered from precipitator 59 via line 61.

In the operation of reactor 36 at least a portion of the gas leaving precipitator 59 via line 61 is recycled via line 62 and line 49 through heater 50 and line 51 and distributor 52 to reactor 36 and, if desired, at least a portion of the gas leaving precipitator 59 via line 61 may be recycled via lines 63 and 51 and distributor 52 to reactor 36.

A portion of the solids removed from solids separator 55 via line 56 is recycled via line 64, line 65, line 44, heater 45 and line 46 for re-introduction into reactor 36. If desired, that portion of the solids recycled may be compacted or reduced in size, if necessary or desired, to a suitable particle size prior to re-introduction into reactor 36.

As illustrated in FIG. 2, solids, particularly those solids within reactor 36 having a substantially large particle size such that these solids are difficult to maintain fluidized within reactor 36, are removed from reactor 36 via line 66. Such large particle size solids may be produced when the molten magnesium chloride and alumina material coat the inert particles within reactor 36 and react thereon to produce magnesium oxide which would remain on and accrete on the inert particles. At least a portion of the solids thus removed is likewise advantageously recycled to reactor 36 with the solids removed via line 56 via line 65 described hereinabove.

The following example is illustrative of one preferred embodiment of the practice of this invention:

EXAMPLE

Magnesium oxide, about 95,000 pounds, having an average particle size of about 500 microns and at a temperature of about 800°C., is maintained as a fluidized solids mass within reactor 36 having an inside diameter of about 14 feet and an overall height of about 18 feet. Nitrogen at a temperature of 1200°C. is introduced into reactor 36 via line 51 and distributor 52 at a rate of about 75 standard cubic feet per second. Molten magnesium chloride at a temperature of 1000°C. is sprayed via line 35 into reactor 36 at a rate of about 95.3 pounds per minute. Alumina having an average particle size of about 150 microns and at a temperature of 1000°C. is introduced via line 41 into reactor 36 at a rate of about 34 pounds per minute. There is thereby produced within reactor 36 a fluidized solids reaction admixture at a temperature of about 800°C. Within reactor 36 the magnesium chloride and alumina react to form gaseous aluminum trichloride at a rate of about 90 pounds per minute while there is maintained in reactor 36 under the aforesaid conditions and at an average bed height of about 6 feet a fluidized solids reaction admixture of about 100,000 pounds. Magnesium oxide having an average particle size of about 1500 microns is withdrawn from reactor 36 via line 66 at a rate of about 42 pounds per minute. Of this amount of magnesium oxide withdrawn, about 1.7 pounds per minute is crushed to an average particle size of about 500 microns and recycled to reactor 36 via line 46.

As will be apparent to those skilled in the art in the light of the foregoing disclosure, many modifications, alterations and substitutions are possible in the practice of this invention without departing from the spirit or scope thereof.

I claim:

1. A method of producing aluminum trichloride and magnesium oxide which comprises reacting alumina or alumina-containing material material which reacts with magnesium chloride in accordance with the chemical equation

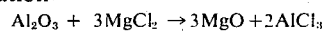

$$Al_2O_3 + 3MgCl_2 \rightarrow 3MgO + 2AlCl_3$$

wherein the reaction is carried out at a temperature in the range from above about the melting point of magnesium chloride to about 2000°C. in the presence of a continually mixed mass of inert solid particulate material and wherein the resulting produced $AlCl_3$ is recovered as a vapor from the resulting produced solid MgO.

2. A method in accordance with claim 1 wherein said mass of inert solid particulate material is provided by a fluidized mass comprising magnesium oxide particles.

3. A method in accordance with claim 1 wherein the magnesium oxide is recovered and employed as said mass of inert solid particulate material.

4. A method in accordance with claim 1 wherein said mass of inert solid particulate material is a fluidized mass produced by flowing an inert gas therethrough.

5. A method in accordance with claim 1 wherein said reaction is carried out at a temperature in the range from about 800°C. to about 1500°C.

6. A method in accordance with claim 1 wherein an inert gas is flowed through said continually mixed mass of inert solid particulate material during the reaction between said aluminiferous material and said magnesium chloride.

7. A method in accordance with claim 1 wherein said magnesium chloride in molten form is applied to said alumina or alumina-containing material material in particle form to coat said alumina or alumina-containing material material and the resulting magnesium chloride coated alumina or alumina-containing material material reacted in the presence of said inert solid particulate material.

8. A method of producing aluminum trichloride and magnesium oxide which comprises forming a fluidized reaction admixture comprising molten anhydrous magnesium chloride and solid alumina-containing particles, flowing inert gas through said fluidized reaction admixture so as to maintain the reaction admixture fluidized, introducing into the reaction admixture molten magnesium chloride and particulate alumina-containing material for reaction in accordance with the chemical equation, $$Al_2O_3 + 3MgCl_2 \rightarrow 3MgO + 2AlCl_3$$

withdrawing the resulting produced aluminum trichloride together with said gas introduced to fluidized the reaction admixture and withdrawing from the reaction admixture solid particulate material comprising magnesium oxide.

9. A method in accordance with claim 8 wherein said reaction admixture is maintained at a temperature in the range 750°–1500°C.

10. A method in accordance with claim 8 wherein said alumina-containing particles and said magnesium chloride are introduced into said reaction admixture at a rate such that the magnesium chloride and the alumina provided by said alumina-containing particles are present in the reaction admixture in substantially stoichiometric amounts in accordance with said chemical equation.

11. A method in accordance with claim 8 wherein the aluminum trichloride withdrawn from said reaction admixture together with said gas is treated to remove any finely divided solid materials therefrom, the resulting substantially solids-free aluminum trichloride and gas cooled to precipitate aluminum trichloride and the resulting substantially aluminum trichloride-free gas re-introduced into contact with said reaction admixture to maintain the reaction admixture fluidized.

12. A method of producing aluminum trichloride and magnesium oxide which comprises forming a fluidized reaction admixture comprising anhydrous magnesium chloride, solid alumina-containing particles and solid particulate inert contact material, flowing inert gas through said fluidized reaction admixture so as to maintain the reaction admixture fluidized, introducing into the reaction admixture magnesium chloride and particulate alumina-containing material for reaction at a temperature above the melting point of anhydrous magnesium chloride in accordance with the chemical equation, $$Al_2O_3 + 3MgCl_2 \rightarrow 3MgO + 1AlCl_3$$

withdrawing the resulting produced aluminum trichloride together with said gas introduced to fluidize the reaction admixture and withdrawing from the reaction admixture solid particulate material comprising magnesium oxide.

13. A method in accordance with claim 12 wherein said reaction temperature is in the range from about the melting point of magnesium chloride to about 2000°C.

14. A method of producing aluminum trichloride and magnesium oxide which comprises applying molten magnesium chloride to particle form alumiferous material, said alumina or alumina-containing material material reacting with said magnesium chloride in accordance with the chemical equation $$Al_2O_3 + 3MgCl_2 \rightarrow 3MgO + 2AlCl_3$$

said reaction being carried out at a temperature in the range from above about the melting point of magnesium chloride to about 2000°C., the resulting reaction admixture made up of said alumina or alumina-containing material material and said magnesium chloride being continually mixed during said reaction and recovering the resulting produced aluminum trichloride in vapor form from the resulting produced solid MgO.

* * * * *

UNITED STATES PATENT AND TRADEMARK OFFICE
CERTIFICATE OF CORRECTION

PATENT NO. : 3,939,247
DATED : February 17, 1976
INVENTOR(S) : Sven Fougner

It is certified that error appears in the above-identified patent and that said Letters Patent are hereby corrected as shown below:

Column 5, line 63, "tihs" should read -- this --
Column 8, Claim 1, line 3, "material", second occurrence, should be omitted
Column 8, Claim 7, lines 3 and 5, respectively, "material", second occurrence, should be omitted
Column 10, Claim 12, the chemical equation should read:

-- $Al_2O_3 + 3MgCl_2 \longrightarrow 3MgO + 2AlCl_3$ --

Column 10, Claim 14, line 3, "alumiferous" should be omitted and replaced with -- alumina or alumina-containing --
Column 10, Claim 14, line 12, "material", second occurrence, should be omitted Signed and Sealed this eighth Day of June 1976

[SEAL]

Attest:

RUTH C. MASON
Attesting Officer

C. MARSHALL DANN
Commissioner of Patents and Trademarks